J. H. BRUBAKER.
INTERNAL COMBUSTION ENGINE.
APPLICATION FILED APR. 5, 1919.
1,323,738.
Patented Dec. 2, 1919.
2 SHEETS—SHEET 2.
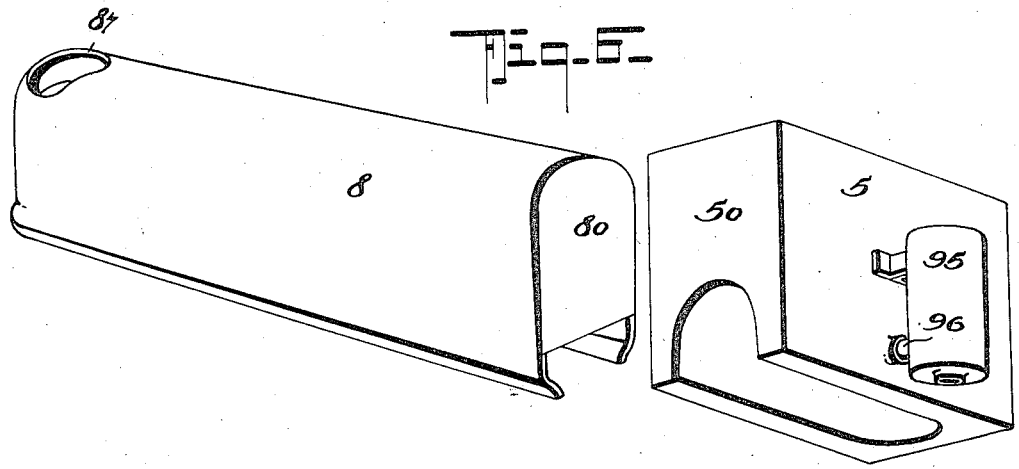
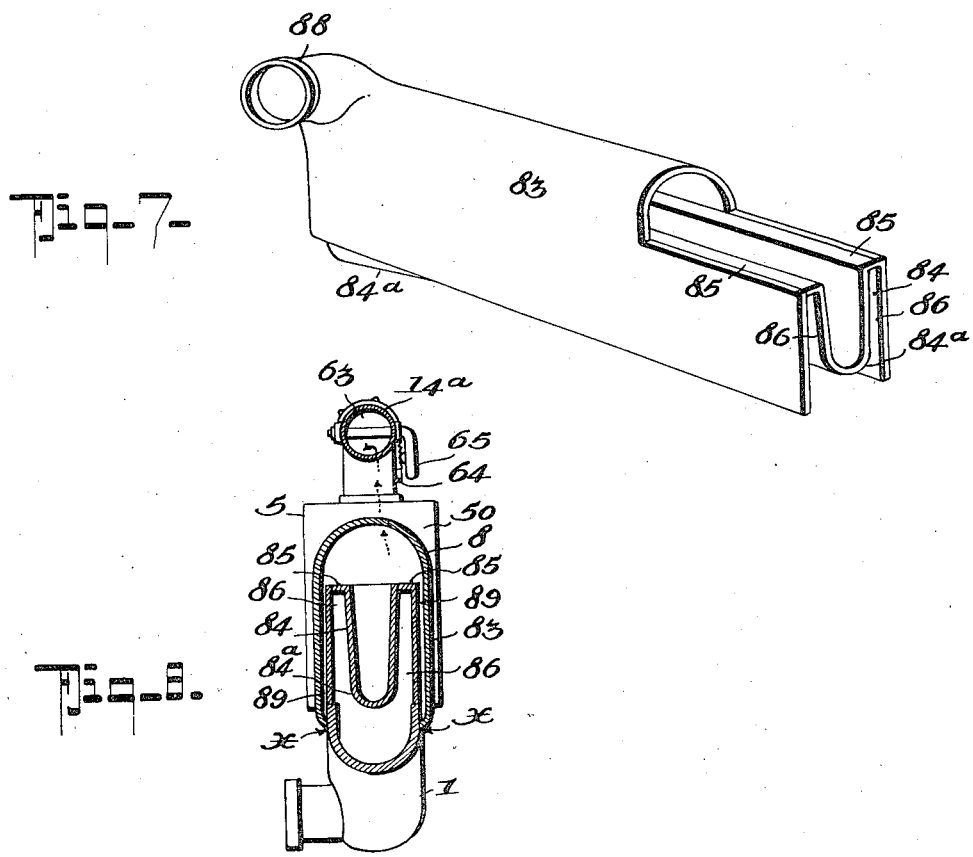
INVENTOR
J. H. Brubaker,
BY
ATTORNEY

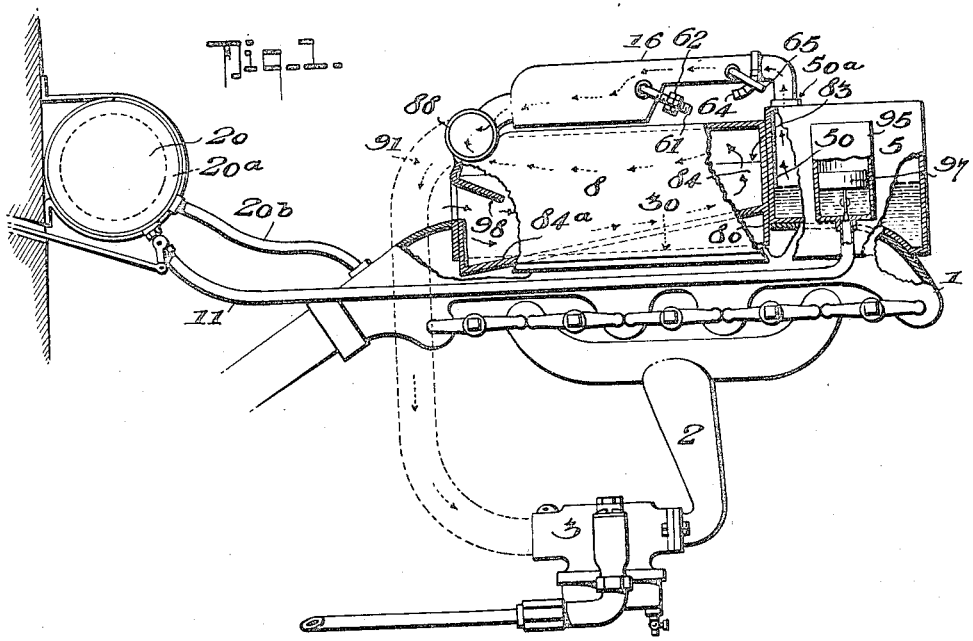
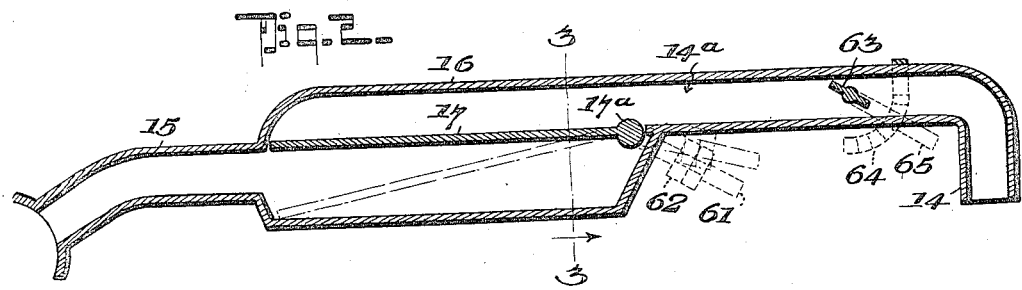
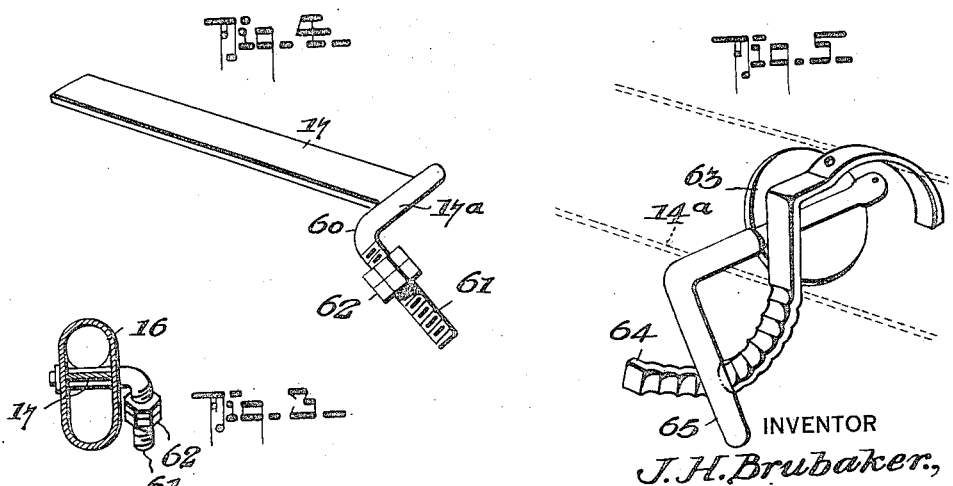

UNITED STATES PATENT OFFICE.

JUDD HANNETTE BRUBAKER, OF WHITE ROCK, SOUTH DAKOTA.

INTERNAL-COMBUSTION ENGINE.

1,323,738. Specification of Letters Patent. Patented Dec. 2, 1919.

Original application filed July 12, 1918, Serial No. 244,631. Divided and this application filed April 5, 1919. Serial No. 287,885.

*To all whom it may concern:*

Be it known that I, JUDD H. BRUBAKER, a citizen of the United States, residing at White Rock, in the county of Roberts and State of South Dakota, have invented certain new and useful Improvements in Internal-Combustion Engines, of which the following is a specification.

This application is a divisional part of my copending application, Serial No. 244,631, filed July 12, 1918, and which discloses an improved vaporizing means that includes a water tank adapted for being secured upon the exhaust manifold casing, a box or jacket through which air is conveyed and heated by contact with the exhaust manifold, the heated air, after mixing with steam generated in the water tank, passing as aqueous vapor to mix with the fuel charges from the carbureter to the intake manifold of the engine.

My present invention embodies an improved means for conveying the steam generated in the water tank to mix with the hot air as it passes from the air heating box or chamber into an outlet that communicates with the carbureter.

In its more specific nature, my present invention embodies an improved means adapted for operation on the suction stroke of the engine, to open up the saturating means with the hot air, as it passes from the air heating box, and which, after the compression stroke of the engine, closes off the said saturating means from the aforesaid air heating box.

In its more subordinate features, my present invention consists in the peculiar construction and combination of parts hereinafter explained, specifically pointed out in the appended claims and illustrated in the accompanying drawings, in which:

Figure 1 is a side elevation of portion of a Ford type of internal combustion engine with my improved vaporizing means applied.

Fig. 2 is a vertical longitudinal section of the means for conveying the steam from the vaporizing tank to the hot air outlet of the air heating box and the control valve devices hereinafter specifically referred to.

Fig. 3 is a cross section thereof on the line 3—3 on Fig. 2.

Fig. 4 is a detail perspective view of the aforesaid control or balance valve.

Fig. 5 is a similar view of the butterfly valve devices hereinafter mentioned.

Fig. 6 is a perspective view that illustrates the air heating box and the steam generating or vapor tank, separated.

Fig. 7 is a perspective view of the supplemental hot air box.

Fig. 8 is a cross section of the air heating box and the valved means for conveying steam from the vaporizing tank to the outlet from the air heating box.

In the drawings my invention is shown as an attachment adapted for being mounted upon the conventional type of exhaust manifold.

1 designates the exhaust manifold, 2 the intake manifold and 3 the carbureter, all of which are of the "Ford" type, it being understood, however, that my said invention may be readily modified for use in connection with other types of engines and exhaust manifolds.

When applied to the exhaust manifold, as shown, the top of the said manifold 1 is cut out, as indicated by the dotted lines 30 on Fig. 1, sufficient of the top at the induction end, however, remaining closed to provide a heat radiating surface for mounting thereon a steam generating tank 5, presently again referred to.

8 designates a hot air box or jacket, which box, when applied, extends lengthwise of the exhaust manifold, as is clearly shown in Fig. 1.

Box 8 is of inverted U shape in cross section, its front end being open for admission of air and the back end closed. Box 8 also includes bent portions along the lower edges of its sides, which portions, when the box is mounted on the open top or cut manifold, grip against the sides of the manifold and are attached thereto by welding, as indicated by *x* on Fig. 8.

83 designates a supplemental hot air box portion whose construction is best shown in Fig. 7 and it comprises the body portion 83 of somewhat less width than the main box portion 8, it being also of inverted U shape in cross section. The box portion 83 includes a member 84 that has a longitudinally extending and pendent trough 84ª for being projected into the top opening of the manifold 1 and to provide additional heat radiating surfaces.

The member 84 has horizontal laterals 110

85—85 that constitute top closures for air pasages 86—86 along the faces of the opposite sides of the box 8 in communication with the manifold 1, as best shown in Figs. 1 and 8.

The open end of the box 8 constitutes an air intake and, when attached to the manifold, as in Fig. 1, its rear or closed end 80 constitutes an abutment for engaging the inner wall 50 of the steam generating box 5 that seats onto the solid top portion of the manifold 1, as is clearly shown in Fig. 1, and in practice, is fixedly held on the said manifold in any approved manner.

The supplemental air box 83 is of the shape best shown in Fig. 7 and, when fitted within the main air box 8, its front or nozzle portion 88 passes up through the opening 87 at the air intake end of the box 8 and projected laterally therefrom for joining with a delivery pipe or flexible hose section 91, see dotted lines on Fig. 1, into which hot and saturated air passes from the box 8 to the carbureter 3.

In practice, when my invention is arranged as an attachment for internal combustion engines, as shown, the box 8 and the steam generator 5 may be made of any suitable sheet metal, preferably sheet steel, but, when my said improvements are to be incorporated, when building the engine, the parts 8 and 5 may be cast as integral portions of the exhaust manifold.

The supplemental portion 83 of the air heater or box 8, in practice, is of heavy sheet metal and, when applied to the box 8, by reason of being of less width than the main heater body or box 8 and having its inner end cut out, as is best shown in Fig. 7, a compartment is provided that brings into communication the main air heating chamber and the supplemental passages or air circulating chambers 83—83, whereby to cause the air to pass within the longitudinal passages 89—89 within the adjacent walls of the outer box 8 and the inner or supplemental box portion 83, thereby subjecting the air to a very large area of heat radiating surface before it returns back for escaping through the exhaust nozzle 88, as indicated by the arrows on Fig. 2.

Mounting the trough-like portion 84 of the supplemental box member 83 over the opening in the manifold 1, the said portion 84$^a$ is held in direct contact with the steam exhaust that passes through the manifold and thereby materially aids in quickly and effectively heating the cold air before it passes to the outlet nozzle 88 and mixes with the hot vapor from the generator 5, in the manner presently explained, and in consequence, the aqueous vapor is caused to pass to the offtake pipe 91 to the carbureter in a hightly superheated condition.

For separating the heated air, as it passes into the nozzle 88, from the incoming cold air, a baffle plate 98 extends inwardly between the cold air intake and the hot air outlet, as is clearly shown in Fig. 1.

In my complete construction of vaporizing means, water is supplied to the tank 5 from a supplemental tank 20 mounted on the dash of the motor driven vehicle and is fed through a valve control pipe connection 11 which delivers into a chamber 95 that is mounted on the generator tank 5 and communicates therewith through a pipe 96.

A float valve 97, in the chamber 95 regulates the water feed from the chamber 95 to the said tank 5. For quickly vaporizing the water which is fed to the vaporizing chamber 5, the said tank 20 is preferably formed with a heating jacket 20$^a$ that is held in communication, through a pipe connection 20$^b$, with the exhaust manifold 1, as shown.

In my present construction of vaporizer, I provide a simple and effective means for conveying steam from the vaporizing tank to discharge and mix with the heated air as it passes into the outlet or nozzle 88 which connects with the lead 91 to the carbureter, and the said means, which constitutes one of the essential features of my present invention and best shown in Figs. 1, 2 and 3 of the drawings, is explained as follows:

16 denotes a supplemental steam chamber that communicates with an intake pipe connection 14$^a$ provided with an elbow portion 14 that is joined in any suitable manner with the steam outlet 50$^a$ from the steam generator 5.

Chamber 16 also connects with a discharge pipe section 15 which communicates with the nozzle outlet 88 that is joined with the carbureter, as is best shown in Figs. 1 and 2.

17 designates a hinged balance valve that is located within the chamber 16 and which, when at the closed position, as in full lines on Fig. 2, shuts off the steam or vapor from passing into the outlet 15 and mixing with the heated air that escapes into the nozzle 88.

Valve 17 on the induction stroke of the engine opens to the dotted position, see Fig. 2, and thereby provides for drawing the generated steam or vapor through the outlet pipe 15 into the nozzle 88 and for saturating the hot air passing through the said nozzle 88.

For balancing the valve 17 against the suction strokes of the engine, the valve head 17$^a$ has an extension 60 which passes through one side of the chamber 16 and terminates in a threaded crank portion 61 which carries an adjustable weight 62.

For regulating the amount of vapor from the generator 5 to the intake pipe 14$^a$ on each suction stroke of the engine, a butterfly valve 63 is mounted in the pipe section 14$^a$, as is best shown in Figs. 2 and 5, by reference to which it will be noticed that the said means includes a segmental rack 64 provided for holding the crank end 65 externally of the pipe 14ª to its adjusted position.

From the foregoing description taken in connection with the drawings, the complete construction, the manner of its operation and the advantages of my invention will be readily apparent to those skilled in the art to which it appertains.

When applied to an exhaust manifold, as shown and described, the air intake of the box 8 is at the front end and, when the auto vehicle is traveling ahead, owing to the engine suction and the baffle 98, air entering the box 8 is drawn to the rear end of the box and then, after distributing over the heating surfaces of the main box 8 and the supplemental box portion 83, it passes forwardly in the direction of the arrows on Fig. 2 and out through the nozzle 88, at which point the air is thoroughly saturated by the intermittent charges of steam from the vaporizer 5 and from thence the saturated or vaporized steam passes through the hose connection 91 to mix with the carbureter charges as they are delivered to the intake manifold, it being understood that the vaporization of the fluid from the split tank 20 is materially aided by primarily heating the water in the said supplemental tank 20, as before mentioned.

That the operative application of my present invention and its advantages be clearly understood, I have shown and described my improved vaporizer in its complete shape. It is to be understood that I make no claim for the general construction and the arrangement of the cold air heating means in this application, since such parts constitute the essential features of my copending application above referred to. The claims in this application have been confined to the specific means for connecting with the vaporizing chamber 5 and discharging the vaporized fluid into the heated air as it passes from the hot air box to the carbureter.

What I claim is:

1. In a motor vehicle internal combustion engine, the combination with the carbureter and the intake and the exhaust manifolds, the exhaust manifold having an opening extending in the direction of its length; of an air heating box and a steam generator, the box including a bottom member that extends into and forms a closure for the opening in the exhaust manifold, the steam generator being shaped to seat onto the closed portion of the manifold, the said box having an air intake at one end, means internally of the box for creating a circulation of the air around the walls of the box and including a discharge nozzle that projects through the said end of the box, other means for connecting the generator and the said nozzle for conveying the steam from the generator into the hot air that passes through the said nozzle, and further means connecting the said nozzle and the carbureter.

2. In a motor vehicle internal combustion engine, the combination with the carbureter and the intake and the exhaust manifolds, the exhaust manifold having an opening extending in the direction of its length; of an air heating box and a steam generator, the box including a bottom member that extends into and forms a closure for the opening in the exhaust manifold, the steam generator being shaped to seat onto the closed portion of the manifold, the said box having an air intake at one end, means internally of the box for creating a circulation of the air around the walls of the box and including a discharge nozzle that projects through the front end of the box, other means for connecting the generator and the said nozzle for conveying the saturating element with the hot air that passes through the nozzle, and further means connecting the said nozzle and the carbureter, and an adjustable valve connection with the said means for connecting the generator and the nozzle for regulating the supply of the saturating element to such nozzle.

3. In a motor vehicle internal combustion engine, the combination with the carbureter and the intake and the exhaust manifolds, the exhaust manifold having an opening extending in the direction of its length; of an air heating box and a steam generator, the box including a bottom member that extends into and forms a closure for the opening in the exhaust manifold, the steam generator being shaped to seat onto the closed portion of the manifold, the said box having an air intake at one end, means internally of the box for creating a circulation of the air around the walls of the box and including a discharge nozzle that projects through the aforesaid end of the box, other means for connecting the generator and the said nozzle for conveying the saturating element into the hot air that passes through the nozzle, and further means connecting the said nozzle and the carbureter, and an engine controlled valve in the said connection from the generator to the nozzle that operates when the engine is under suction to open up the steam generator to the hot air discharging nozzle.

JUDD HANNETTE BRUBAKER.